(12) United States Patent
Bandy (10) Patent No.: US 7,283,044 B2
(45) Date of Patent: Oct. 16, 2007

(54) METHOD AND APPARATUS FOR A PRIVACY ENABLING RADIO FREQUENCY IDENTIFICATION (RFID) READER

(75) Inventor: William R. Bandy, Gambrills, MD (US)

(73) Assignee: Symbol Technologies, Inc., Holtsville, NY (US)

(*) Notice: Subject to any disclaimer, the term of this patent is extended or adjusted under 35 U.S.C. 154(b) by 188 days.

(21) Appl. No.: 11/091,525

(22) Filed: Mar. 29, 2005

(65) Prior Publication Data

US 2006/0226969 A1 Oct. 12, 2006

(51) Int. Cl.
G08B 26/00 (2006.01)
G08B 13/14 (2006.01)
G06F 17/00 (2006.01)
G06K 5/00 (2006.01)
G06K 19/06 (2006.01)

(52) U.S. Cl. .................. 340/505; 340/10.1; 340/10.4; 340/10.41; 340/539.1; 340/572.1; 340/928; 235/375; 235/380; 235/492

(58) Field of Classification Search ............... 340/505, 340/572.1, 10.1, 10.41, 10.4, 928; 235/375, 235/380, 492
See application file for complete search history.

(56) References Cited

U.S. PATENT DOCUMENTS

| | | | |
|---|---|---|---|
| 5,559,501 A * | 9/1996 | Barzegar et al. ............ 340/825 |
| 5,995,019 A | 11/1999 | Chieu et al. |
| 6,107,910 A | 8/2000 | Nysen |
| 6,297,737 B1 * | 10/2001 | Irvin ........................ 340/571 |
| 6,433,671 B1 | 8/2002 | Nysen |
| 6,518,993 B2 * | 2/2003 | Kerai et al. .............. 348/14.01 |
| 6,531,957 B1 | 3/2003 | Nysen |
| 6,580,358 B1 | 6/2003 | Nysen |
| 6,826,473 B1 * | 11/2004 | Burch et al. ................ 701/207 |
| 6,950,009 B1 | 9/2005 | Nysen |
| 6,970,070 B2 * | 11/2005 | Juels et al. ................ 340/10.1 |
| 7,086,587 B2 * | 8/2006 | Myllymaki .................. 235/380 |
| 7,109,865 B2 * | 9/2006 | Paradiso et al. .......... 340/572.1 |
| 2003/0192950 A1 * | 10/2003 | Muterspaugh ......... 235/472.01 |
| 2005/0099268 A1 * | 5/2005 | Juels et al. ................ 340/10.4 |
| 2006/0082470 A1 * | 4/2006 | Zhu et al. .................... 340/928 |

* cited by examiner

*Primary Examiner*—Benjamin C. Lee
*Assistant Examiner*—Lam Pham
(74) *Attorney, Agent, or Firm*—Sterne, Kessler, Goldstein & Fox PLLC (57) ABSTRACT

In an aspect of the present invention, an individual carries a mobile communications device, such as a cell phone, that listens for readers attempting to read tags associated with the individual. In a further aspect of the present invention, the mobile communications device operates to mask the transmissions of these readers, to prevent them from reading the tags.

20 Claims, 6 Drawing Sheets

METHOD AND APPARATUS FOR A PRIVACY ENABLING RADIO FREQUENCY IDENTIFICATION (RFID) READER

BACKGROUND OF THE INVENTION

1. Field of the Invention

The present invention relates generally to radio frequency identification (RFID) technology. More particularly, the present invention relates to devices that address privacy concerns related to RFID technology.

2. Related Art

Radio frequency identification (RFID) tags are electronic devices that may be affixed to items whose presence is to be detected and/or monitored. The presence of an RFID tag, and therefore the presence of the item to which the tag is affixed, may be checked and monitored by devices known as "readers." Readers typically transmit radio frequency signals to which the tags respond. Each tag stores a unique identification number. The tags respond to the reader transmitted signals by providing their identification number, bit-by-bit, so that they can be identified.

RFID tag and reader technology has many applications. For example, RFID tags and readers can be used to enhance retail "checkout" systems. In such systems, tags can be attached to items that are on sale. At checkout, by reading the tags, a reader can be used to identify the items a customer has selected for purchase, and a total cost for the items can be provided. The customer then pays for the items, and removes the items from the store.

A problem with such a system and with RFID tags in general, relates to privacy. For example, in many cases, it is difficult to remove a tag from an item after the item has been purchased, such as when the tag is embedded inside the item. Thus, in many cases, a purchased item can still be identified by a reader even after leaving a store. For example, if the item is clothing, and the RFID tag is not removed, a person may wear the clothing item days after purchase still having an operational tag embedded within. This may leave the person susceptible to subsequent readers that the customer may encounter. Subsequent readers may be able to read the tags in the items that the person carries, to discern information about the person that he/she may desire to keep private, such as their product preferences, spending habits, etc.

In order to solve this problem, tags have been designed that can be disabled. For example, after an item is sold, instead of physically removing the tag from the item, the associated tag can be electrically (or otherwise) disabled from ever operating again. Thus, subsequent readers could not thereafter read the tag. However, tag disabling systems are not foolproof, and on occasion, items leave stores with operating tags still attached.

Thus, what is needed are ways of enabling and ensuring privacy for consumers who purchase and/or carry items associated with RFID tags.

SUMMARY OF THE INVENTION

The present invention is directed to methods, systems, and apparatuses for enabling privacy for consumers who may purchase, wear, carry, or otherwise transport items associated with RFID tags.

In an aspect of the present invention, an individual carries a mobile communications device, such as a cell phone, that listens for readers attempting to read tags associated with the individual. Thus, the individual can be alerted to such read attempts. In a further aspect of the present invention, the mobile communications device operates to mask the transmissions of these readers, to prevent them from reading the tags.

In an example aspect of the present invention, the mobile communications device includes a receiver capable of detecting an interrogation signal transmitted by a RFID reader device, and an indicator device that provides an indication to a user if the interrogation signal is detected.

In a further aspect, the receiver is further capable of detecting a response by an RFID tag to the detected interrogation signal.

In a still further aspect, the indicator device provides a second indication to a user if the response by an RFID tag is detected.

In a still further aspect, the mobile communications device includes a memory device and a reader module. The reader module is capable of reading RFID tags to determine identification numbers corresponding to the RFID tags and a memory device. For example, the reader module reads tags associated with the user. The memory device stores the determined identification numbers.

In a still further aspect, the indicator device provides a third indication to a user if a response by a RFID tag is detected and if the responding RFID tag responds with a string of bits that match a corresponding portion of one of the stored identification numbers.

In a still further aspect, the mobile communications device includes a transmitter that transmits a masking signal to mask further response by the RFID tag to the detected interrogation signal.

These and other advantages and features will become readily apparent in view of the following detailed description of the invention. Note that the Summary and Abstract sections may set forth one or more, but not all exemplary embodiments of the present invention as contemplated by the inventor(s), and thus, are not intended to limit claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

1.0 Overview

The present invention provides improved processes and systems for enabling privacy for persons who may purchase, wear, carry, and otherwise transport items associated with RFID tags. The following subsection describes exemplary tag devices, followed by a subsection providing exemplary embodiments of the present invention.

2.0 Exemplary Tag Device

Figure 1:
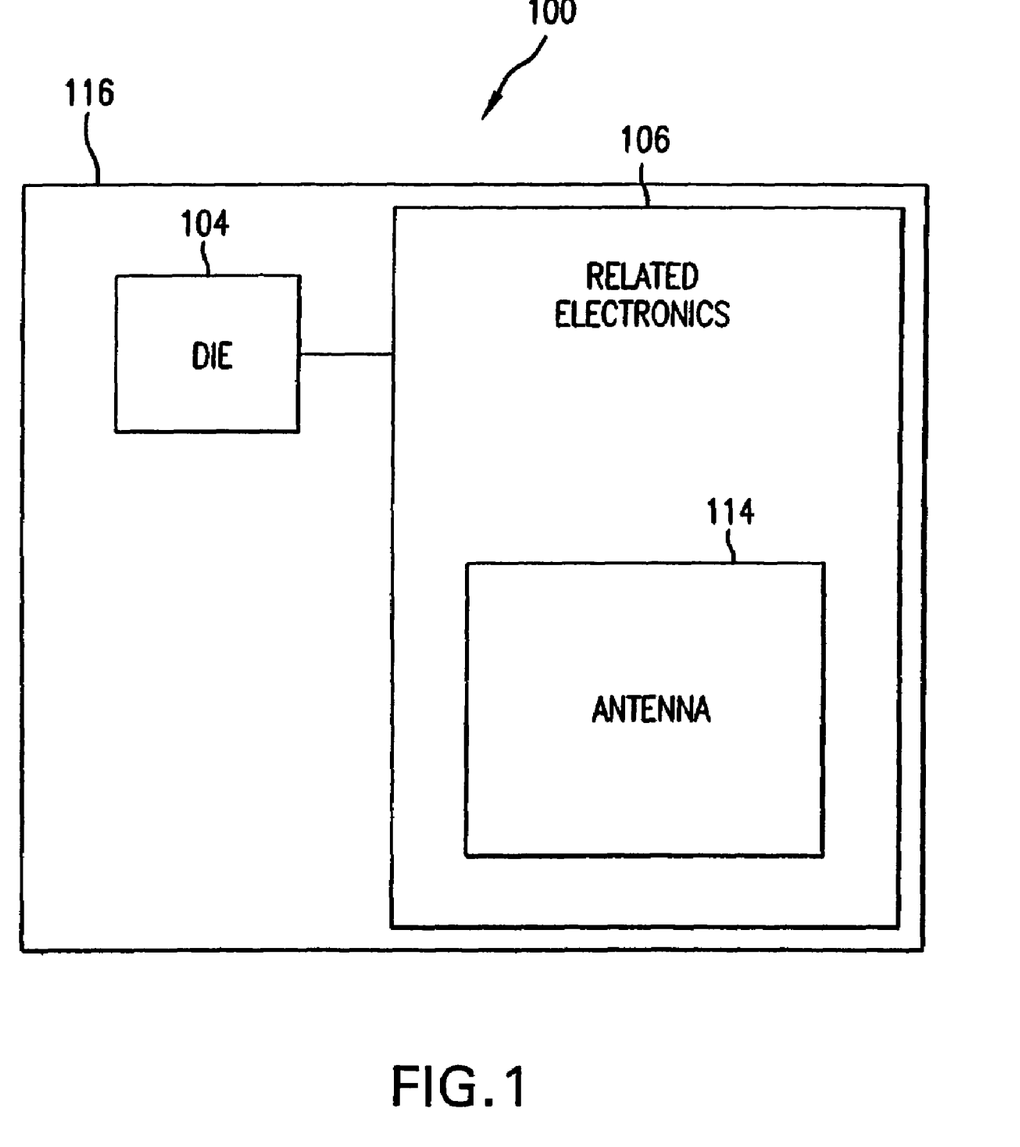
FIG. 1 shows a block diagram of an exemplary RFID tag, according to an embodiment of the present invention.

The present invention is directed to all types of RFID tag devices. FIG. 1 shows a block diagram of an exemplary RFID tag 100, according to an embodiment of the present invention. As shown in FIG. 1, RFID tag 100 includes a die 104 and related electronics 106 located on a tag substrate 116. Related electronics 106 includes an antenna 114 in the present example. Die 104 can be mounted onto antenna 114 of related electronics 106, or on other locations of substrate 116. As is further described elsewhere herein, die 104 may be mounted in either a pads up or pads down orientation.

RFID tag 100 may be located in an area having a large number, population, or pool of RFID tags present. Tag 100 receives interrogation signals transmitted by one or more tag readers. According to interrogation protocols, tag 100 responds to these signals. The response(s) of tag 100 includes information that the reader can use to identify the corresponding tag 100. Once the tag 100 is identified, the existence of tag 100 within a coverage area defined by the tag reader is ascertained.

RFID tag 100 may be used in various applications, such as inventory control, airport baggage monitoring, as well as security and surveillance applications. Thus, tag 100 can be affixed to items such as airline baggage, retail inventory, warehouse inventory, automobiles, compact discs (CDs), digital video discs (DVDs), video tapes, and other objects. Tag 100 enables location monitoring and real time tracking of such items.

In the present embodiment, die 104 is an integrated circuit that performs RFID operations, such as communicating with one or more tag readers (not shown) according to various interrogation protocols. Exemplary interrogation protocols are described in U.S. Pat. No. 6,002,344 issued Dec. 14, 1999 to Bandy et al. entitled System and Method for Electronic Inventory, and U.S. patent application Ser. No. 10/072,885, filed on Feb. 12, 2002, both of which are incorporated by reference herein in their entirety. Die 104 includes a plurality of contact pads that each provide an electrical connection with related electronics 106.

Related electronics 106 are connected to die 104 through a plurality of contact pads of IC die 104. In embodiments, related electronics 106 provide one or more capabilities, including RF reception and transmission capabilities, impedance matching, sensor functionality, power reception and storage functionality, as well as additional capabilities.

As shown in FIG. 1, tag substrate 116 has a first surface that accommodates die 104, related electronics 106, as well as further components of tag 100. Tag substrate 116 also has a second surface that is opposite the first surface. An adhesive material and/or backing can be included on the second surface. When present, an adhesive backing enables tag 100 to be attached to objects, such as books, containers, and consumer products.

3.0 Exemplary Privacy Enabling Embodiments of the Present Invention

As described above, the present invention provides improved processes and systems for enabling privacy for persons who may purchase, wear, carry, and otherwise transport items associated with RFID tags. An application of embodiments of the present invention is to address concerns that privacy advocate groups may have with regards to RFID technology.

Figure 2:
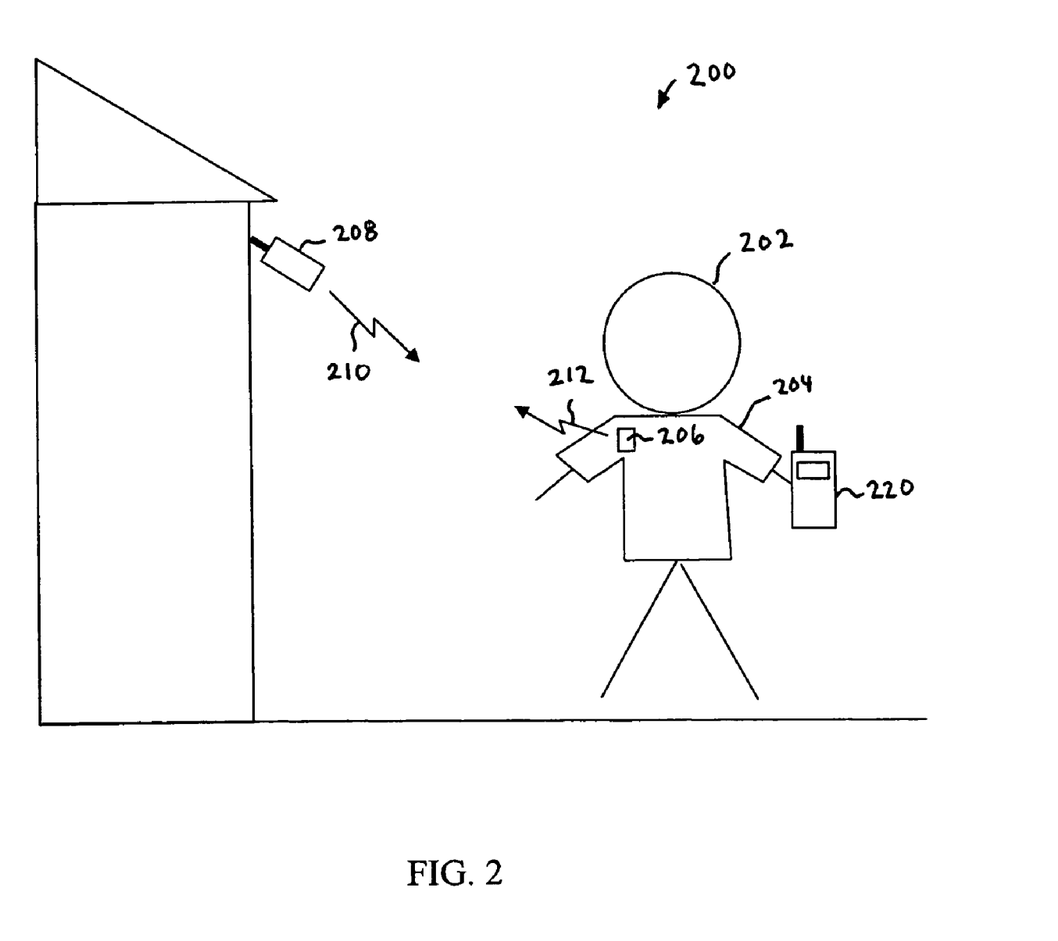
FIG. 2 shows an example environment where embodiments of the present invention may be applied to enable/enhance privacy.

For example, FIG. 2 shows an example environment 200 where embodiments of the present invention may be applied to enable/enhance privacy. In environment 200, a user 202 wears an article of clothing 204, having an operating tag 206 embedded therein. For example, user 202 may have purchased clothing 204. When purchasing clothing 204, tag 206 was not removed or disabled. Environment 200 also includes a reader 208. Reader 208 is controlled by an entity. Reader 208 may be attached to any structure, including a building. Alternatively, reader 208 can be a mobile reader (e.g., hand carried). User 202 encounters reader 208 at a point in time typically without the knowledge of user 202. When user 202 encounters reader 208, reader 208 transmits an interrogation signal 210 in an attempt to read tags in its vicinity, including tag 206 carried by user 202. Because it is operational, tag 206 responds to reader 208 with a tag response 212.

The entity may use reader 208 to read tag 206 carried by user 202 in order to learn information about user 202 from tag response 212. Tag response 212 may identify clothing 204, providing the entity with the ability to discern information about user 202, including a clothing (product) preference of user 202, an amount of money user 202 is willing to spend on a clothing item, etc.

However, user 202 may not want such information to be determinable by others. Thus, user 202 carries a mobile communications device 220 configured to enable privacy for user 202, according to an embodiment of the present invention.

Figure 3:
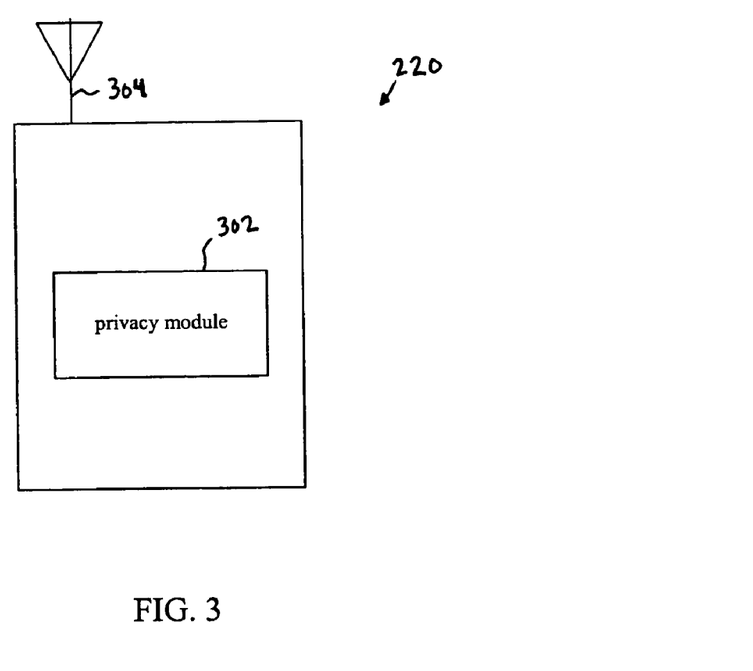
FIG. 3 shows an example mobile communications device, according to an example embodiment of the present invention.

FIG. 3 shows an example mobile communications device 220, according to an example embodiment of the present invention. As shown in FIG. 3, mobile communications device 220 includes a privacy module 302 that enables privacy for user 202 with respect to RFID readers, such as reader 208 shown in FIG. 2. In example embodiments, mobile communications device 220 can be a cell phone, a laptop computer, a handheld computing device (e.g., a palm pilot, personal digital assistant (PDA), etc.), or other device adapted to include privacy module 302. Alternatively, mobile communications device 220 can be a special purpose device developed with privacy enablement as its primary function.

As shown in FIG. 3, mobile communications device 220 further includes an antenna 304. In the embodiment of FIG. 3, antenna 304 allows mobile communications device 220 to transmit and receive radio frequency (RF) signals, including receiving signals from readers and tags, and transmitting tag emulating signals.

Figure 4:
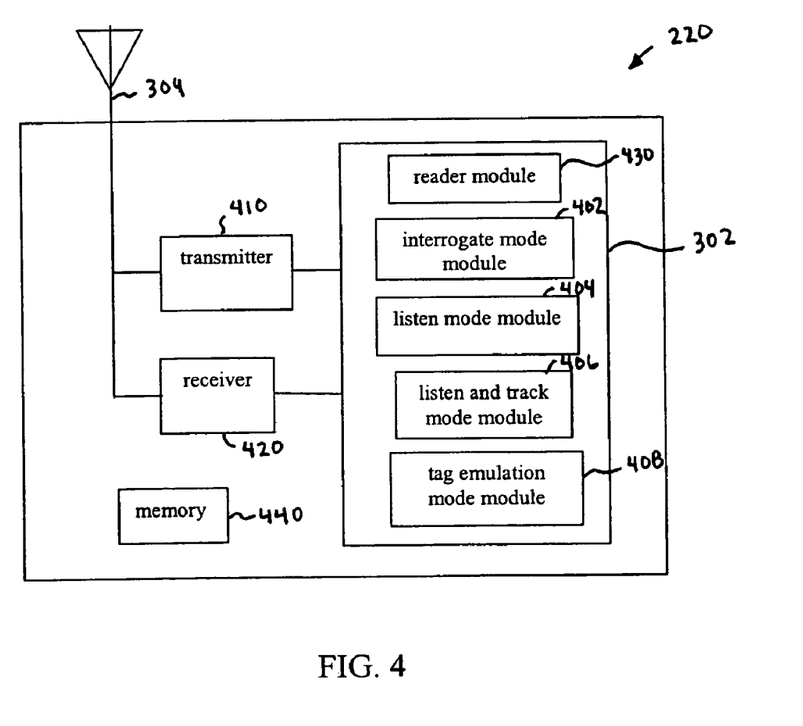
FIG. 4 shows an example mobile communications device, including various modules of an example privacy module, according to an embodiment of the present invention.

FIG. 4 shows an example mobile communications device 220, including various modules of an example privacy module 302, according to an embodiment of the present invention. In FIG. 4, mobile communications device 220 includes privacy module 302, a transmitter 410, a receiver 420, and a memory 440. In an embodiment, transmitter 410 and receiver 420 are those that are present in commercial off-the-shelf versions of mobile communications device 220, such as the transmitter and receiver (or transceiver) present in a cell phone. Alternatively, transmitter 410 and receiver 420 may be installed in mobile communications device 220 for use with embodiments of the present invention.

As shown in FIG. 4, privacy module 302 includes an interrogation mode module 402, a listen mode module 404, a listen and track mode module 406, and a tag emulation mode module 408. These mode modules are described in detail below. A user of mobile communications device 220 controls in which mode privacy module 302 operates. For example, mobile communications device 220 can include any combination of one or more buttons, a graphical user interface (GUI), and/or other user input devices, for a user to interact with to set mobile communications device 220 into a particular operational mode. As shown in FIG. 4, privacy module 302 also includes a reader module 430.

A user interacts with the input device(s) of mobile communications device 220 to cause mobile communications device 220 to enable privacy. For example, the user can interact with mobile communications device 220 to cause mobile communications device 220 to enter an interrogation mode, causing interrogation mode module 402 to become active. Interrogation mode module 402 causes mobile communications device 220 to attempt to interrogate/read tags in the immediate vicinity of the user, focusing particularly upon tags in the user's clothing, personal items, etc.

Figure 5:
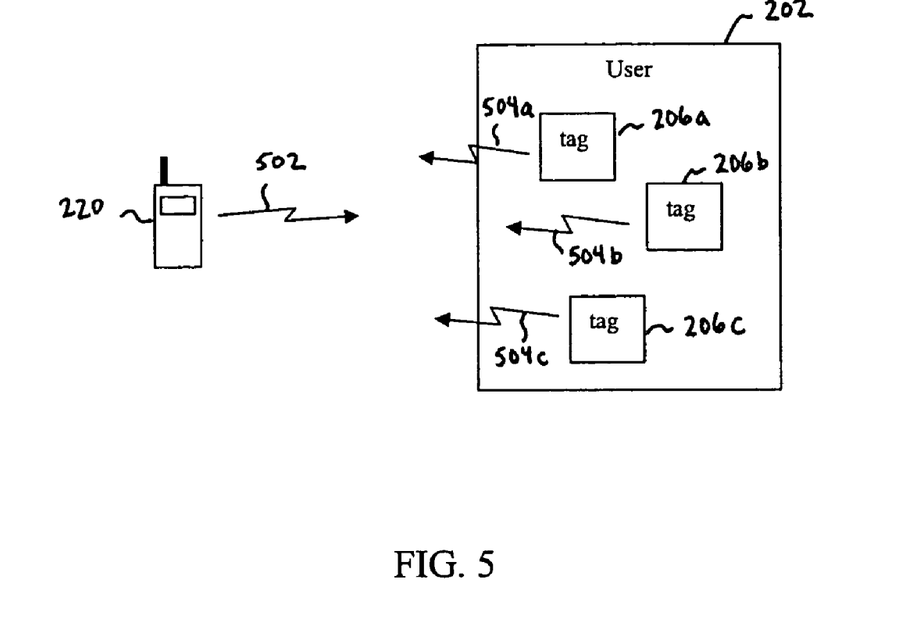
FIG. 5 shows a mobile communications device operating in an interrogation mode, according to an example embodiment of the present invention.

For example, FIG. 5 shows mobile communications device 220 being used to interrogate tags 206a-206c being carried by user 202. Mobile communications device 220 transmits a read/interrogation signal 502, and tags 206a-206 transmit respective responses 504a-504c. Reader module 430 is used to perform the interrogation(s) using transmitter 410 and receiver 420. Reader module 430 includes hardware, software, firmware, or any combination thereof, as needed to perform its functions. Reader module 430 may perform one or more interrogation/read protocols, as would be known to persons skilled in the relevant art(s), to read as many tags associated with the user as possible. Example such protocols include binary protocols, slotted aloha protocols, and those required by the following standards: Class 0, Class 1, and Gen 2. In an embodiment, reader module 430 determines the identification numbers stored in the tags associated with the user.

Thus, interrogation mode module 402 can be used to determine whether there are any operating tags associated with the user. This allows the user to validate whether merchandise tags have really been deactivated, etc.

Furthermore, in an embodiment, interrogation mode module 402 stores the identification numbers obtained for any operating tags in a memory 440 of mobile communications device 220. Memory 440 can be built-in memory of mobile communications device 220, or can be additional memory installed in mobile communications device 220 for this purpose.

Figure 6:
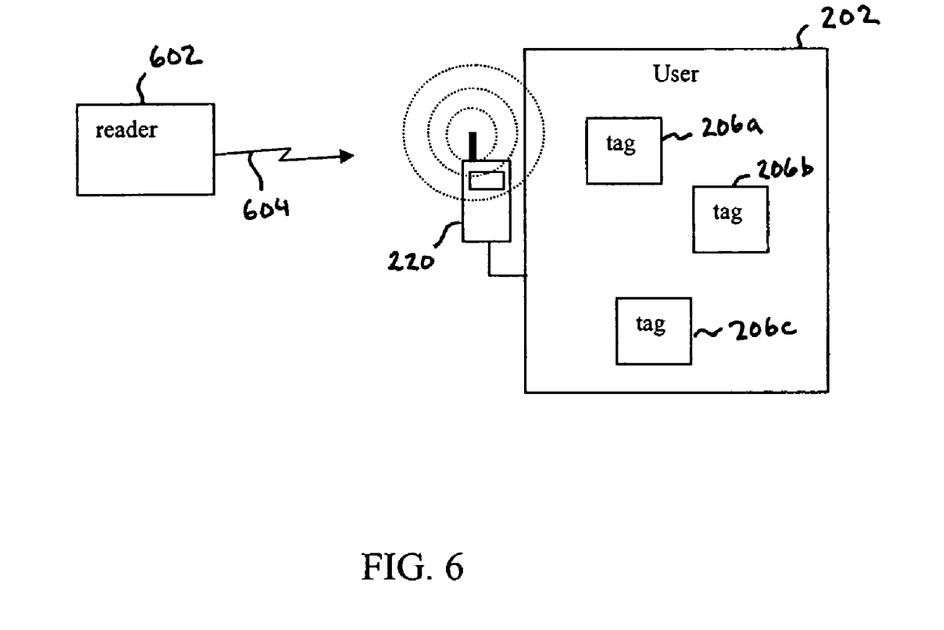
FIG. 6 shows a mobile communications device operating in a listen mode, according to an example embodiment of the present invention.

A user can further interact with mobile communications device 220 to cause mobile communications device 220 to enter a "listen" mode, causing listen mode module 404 to become active. For example, FIG. 6 shows mobile communications device 220 operating in a listen mode. Listen mode module 404 causes mobile communications device 220 to "listen" for the interrogation/read signals 604 of other RFID readers 602, such as reader 208 shown in FIG. 2. Thus, listen mode module 404 uses receiver 420 to monitor for signals transmitted by other readers. This allows a user 202 of mobile communications device 220 to be alerted when reader 602 is attempting to read tags in the vicinity of user 202, including tags 206 associated with user 202. When reader signal 604 is detected, an indicator device of mobile communications device 220 can alert user 202. For example, an indicator light, sound device, vibrating mechanism, and/or display of mobile communications device 220 can be used to alert user 202 of reader 602.

Figure 7:
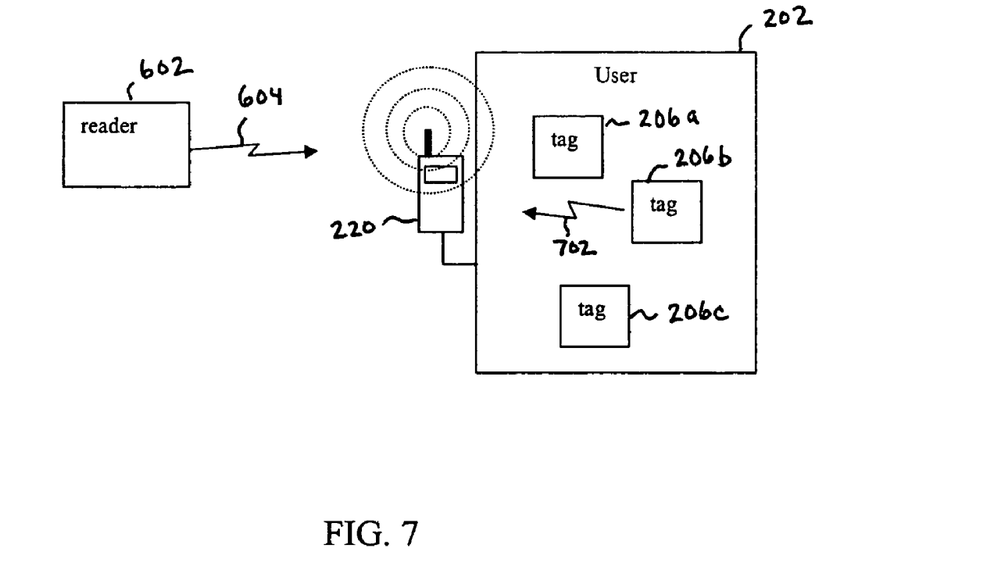
FIG. 7 shows a mobile communications device operating in a listen and track mode, according to an example embodiment of the present invention.

A user can further interact with mobile communications device 220 to cause mobile communications device 220 to enter a "listen and track" mode, causing listen and track mode module 406 to become active. Listen and track mode module 406 causes mobile communications device 220 to listen for other readers as described above with respect to listen mode module 404. Furthermore, listen and track mode module 406 also detects whether tags associated with the user are responding.

For example, FIG. 7 shows mobile communications device 220 operating in a listen and track mode. Listen and track mode module 406 causes mobile communications device 220 to detect tag responses, such as a tag response 702 by tag 206b, and compare the tag responses to the tag identification numbers stored in memory 440. In an embodiment, if a tag response is detected that matches a stored identification number, a tag associated with the user has been read. In another embodiment, if a string of tag response bits matches a corresponding portion of one of the stored identification numbers, it is assumed that one of the tags associated with the user is in the process of responding to a reader. In either of these situations, an indicator device of mobile communications device 220 can provide an indication to user 202 that one or more tags associated with user 202 have been read and/or are being read.

Figure 8:
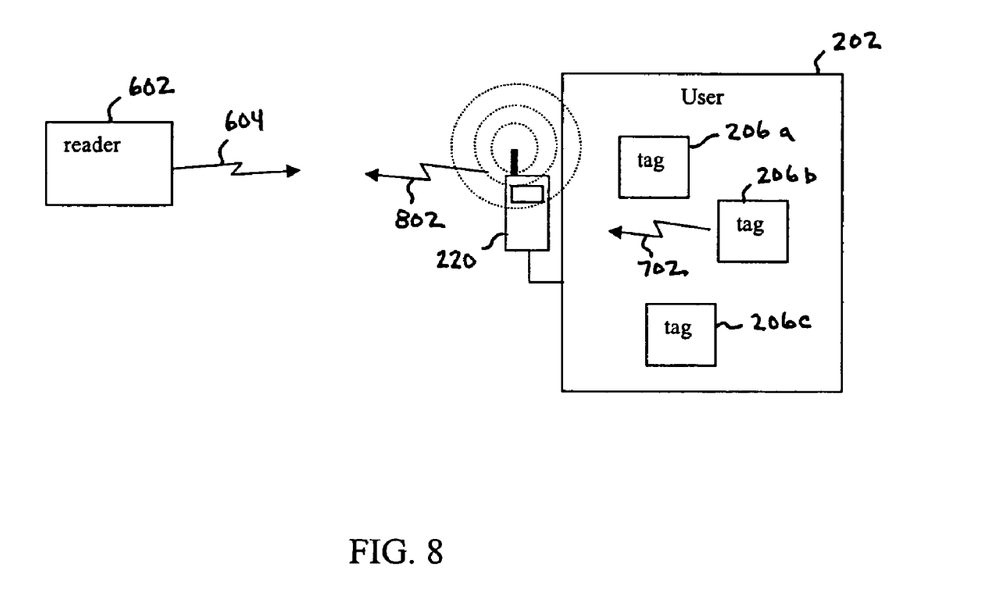
FIG. 8 shows a mobile communications device operating in a tag emulation mode, according to an example embodiment of the present invention.

A user can further interact with mobile communications device 220 to cause mobile communications device 220 to enter a tag emulation mode, causing tag emulation mode module 408 to become active. Tag emulation mode module 408 causes mobile communications device 220 to listen for readers and to track tag responses, as described above with respect to listen and track mode module 406. Furthermore, tag emulation mode module 408 causes mobile communications device 220 to send out a masking signal when it is determined that a tag associated with the user is being read. Thus, when it is detected that a tag is responding with a string of bits matching a corresponding portion of a stored identification number, transmitter 410 is directed to send out the masking signal. For example, FIG. 8 shows mobile communications device 220 operating in a tag emulation mode. Mobile communications device 220 transmits a masking signal 802. Masking signal 802 is used to confuse the interrogating reader 602, to not allow responding tag 206b associated with user 202 to be successfully read by reader 602.

As described above, mobile communications device 220 can be configured to handle any number of one or more reader-tag communications protocols, and to emulate a tag accordingly. For example, under the Gen 2 tag protocol standard, when it is detected that a RN16 signal is being sent out by a responding tag, mobile communications device 220 transmits a masking signal. The masking signal can be configured for a particular tag type. For example, if the tag responds with one of a pair of frequencies to signify a "0" or "1" bit, the masking signal can include one or both of these frequencies to mask the responding tag. If the tag responds in particular time slots to indicate bit values, the masking signal can include responses in multiple time slots to mask the responding tag. In embodiments, the masking signal can include amplitude modulation, frequency modulation, phase modulation, and/or other signal timing or components to mask the responding tag.

3.1 Example Mobile Communication Device Embodiments

Figure 9:
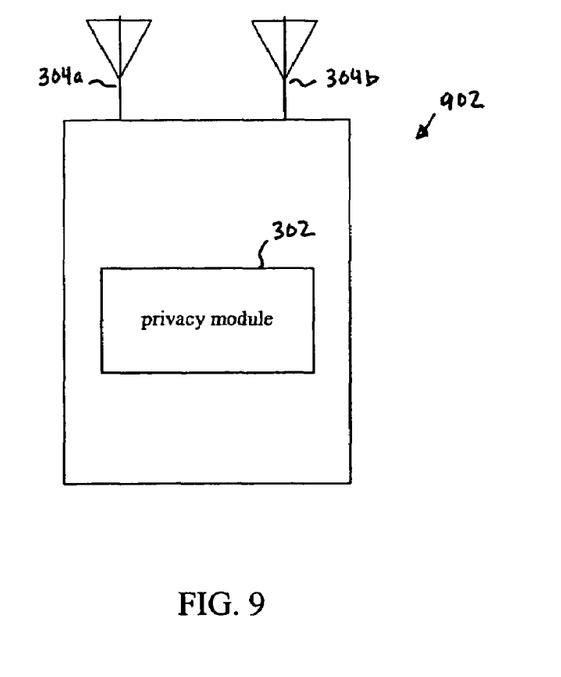
FIGS. 9 and 10 show example mobile communication devices, according to embodiments of the present invention.
Figure 10:
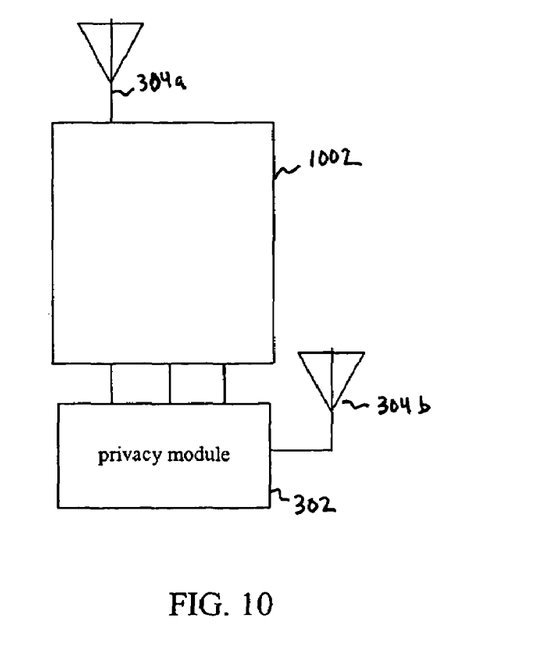

As described above, FIG. 3 shows an exemplary mobile communication device 220. Further examples for mobile communication device 220 are shown in FIGS. 9 and 10, according to embodiments of the present invention. The mobile communications devices of FIGS. 3, 9, and 10 show various ways that privacy module 302 and antenna(s) 304 may be incorporated into, or associated with a mobile communications device, for illustrative purposes. Further configurations for mobile communications devices will be understood to persons skilled in the relevant art(s) from the teachings herein. As described above, a mobile communications device of the present invention can be a commercially available device, such as a cell phone or PDA, that is adapted to include the functionality of privacy module 302, or can be a special purpose device.

As shown in FIG. 3, privacy module 302 is integrated into mobile communications device 220. Thus, for example, privacy module 302 may include hardware, software, firmware, or any combination thereof. In an embodiment, for example, privacy module 302 can include software or firmware that is downloaded into mobile communications device.

Furthermore, as shown in FIG. 3, mobile communications device 220 has a single antenna 304. Thus, in the embodiment of FIG. 3, antenna 304 is configured to transmit and/or receive signals of the frequencies required by mobile communications device 220. For example, if mobile communications device 220 is a cell phone, antenna 304 is configured to transmit and/or receive signals in cell phone frequency ranges. Furthermore, antenna 304 is configured to transmit and/or receive signals in a frequency range required by the RFID features of mobile communications device 220. Thus, antenna 304 can transmit RFID reader frequencies and can receive tag responses. Furthermore, when mobile communications device 220 is operating in a tag emulation mode, antenna 304 can transmit masking signals that emulate tag responses.

FIG. 9 shows a mobile communications device 902. As shown in FIG. 9, mobile communication device 902 includes privacy module 302. Thus, similarly to mobile communications device 220 of FIG. 3, privacy module 302 includes software, hardware, firmware, or any combination thereof, stored or housed in mobile communications device 902.

As shown in FIG. 9, mobile communications device 902 has a first antenna 304a and a second antenna 304b. In the embodiment of FIG. 9, first antenna 304a is used to transmit and/or receive signals of a first frequency range, and second antenna 304b is used to transmit and/or receive signals of a second frequency range. For example, first antenna 304a may be used to allow mobile communications device 902 to operate as a cell phone. Thus, first antenna 304a is configured to transmit and/or receive signals in cell phone frequency ranges. Furthermore, second antenna 304b is configured to transmit and/or receive signals in a frequency range required by the RFID features of mobile communications device 902.

FIG. 10 shows a mobile communications device 1002. As shown in FIG. 10, privacy module 302 is an external plug-in module that attaches to mobile communications device 1002. Privacy module 302 plugs into an interface of mobile communications device 1002, such as a serial port, a parallel port, a USB port, or other data port or interface type. The interface can be an accessory port, an infrared port, or any other interface or port capable of transferring data to and from mobile communications device 1002 such as a wireless phone data/software interface.

Furthermore, as shown in FIG. 10, privacy module 302 includes second antenna 304b. Thus, by attaching privacy module 302 (with second antenna 304b) to a commercially available mobile communications device having a single antenna, such as a cell phone, the device can be converted into a multi-antenna device capable of communicating at cell phone and RFID reader/tag frequency ranges, according to embodiment of the present invention.

4.0 Conclusion

While various embodiments of the present invention have been described above, it should be understood that they have been presented by way of example, and not limitation. It will be apparent to persons skilled in the relevant arts that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A device, comprising:
  a receiver that detects a response signal transmitted by a radio frequency identification (RFID) tag in response to an external interrogation signal transmitted by an external RFID reader device;
  an indicator that provides an indication to a user if said receiver detects said response signal; and
  a transmitter that transmits a masking signal to mask at least a portion of said response signal transmitted by said RFID tag if said receiver detects a response signal of said RFID tag transmitted in response to said external interrogation signal.

2. The device of claim 1, further comprising:
  a reader module that reads RFID tags to determine identification numbers corresponding to said RFID tags; and
  a memory device that stores said identification numbers.

3. The device of claim 2, wherein said receiver further detects said external interrogation signal.

4. The device of claim 3, wherein said indicator device provides a second indication to the user if said receiver detects said external interrogation signal.

5. The device of claim 2, wherein said indicator provides a third indication to the user if said receiver detects said response signal and said responding RFID tag responds with a string of bits that match a corresponding portion of one of said identification numbers stored in said memory.

6. The device of claim 2, wherein said indicator provides a third indication to the user if said receiver detects said response signal and an identification number of said responding RFID tag matches one of said identification numbers stored in said memory.

7. The device of claim 1, further comprising:
means for receiving and transmitting a cellular telephone call.

8. The device of claim 7, wherein the device is a cell phone.

9. The device of claim 1, wherein the device is a handheld computing device.

10. The device of claim 1, wherein the device is a laptop computer.

11. The device of claim 1, further comprising:
a first antenna coupled to said receiver.

12. The device of claim 11, wherein said first antenna receives signals of a first frequency range, the device further comprising:
a second antenna that transmits and receives signals of a second frequency range.

13. The device of claim 12, further comprising:
a housing; and
a plug-in module;
wherein said receiver is positioned in said plug-in module and said first antenna is mounted to said plug-in module, and
wherein said second antenna is mounted to said housing.

14. The device of claim 11, further comprising:
a housing, wherein said receiver is positioned in said housing and said first antenna is mounted to said housing.

15. A method for providing a user with indication of unwanted interrogation by an external radio frequency identification (RFID) reader device, comprising:

monitoring for a response signal transmitted by an RFID tag in response to an external interrogation signal transmitted by an external RFID reader device; and if the response signal is detected, providing an indication to the user and selectively transmitting a masking signal to mask further response by the responding RFID tag.

16. The method of claim 15, further comprising:
reading RFID tags to determine identification numbers corresponding to the RFID tags; and
storing the determined identification numbers.

17. The method of claim 15, further comprising:
monitoring for the external interrogation signal.

18. The method of claim 17, further comprising:
if the external interrogation signal is detected, providing a second indication to the user.

19. The method of claim 16, further comprising:
if an RFID tag response to the external interrogation signal is detected and the responding RFID tag responds with a string of bits that match a corresponding portion of a stored identification number, providing a second indication to a user that the response was detected and the match occurred.

20. The method of claim 19, further comprising:
if the response signal is detected and the match occurred, transmitting the masking signal to mask further response by the responding RFID tag.

* * * * *